Aug. 25, 1959     J. L. THIBODEAU     2,901,051
TRACTOR DRIVE AND SUSPENSION MECHANISM
Filed April 30, 1954     6 Sheets-Sheet 1

Fig. 1

INVENTOR.
JOHN L. THIBODEAU
BY
McMorrow, Berman & Davidson
ATTORNEYS

Fig. 3

INVENTOR.
JOHN L. THIBODEAU
BY
McMorrow, Berman
and Davidson
ATTORNEYS

Aug. 25, 1959  J. L. THIBODEAU  2,901,051
TRACTOR DRIVE AND SUSPENSION MECHANISM
Filed April 30, 1954  6 Sheets-Sheet 6

INVENTOR.
JOHN L. THIBODEAU
BY
McMorrow, Berman & Davidson
ATTORNEYS

United States Patent Office 2,901,051
Patented Aug. 25, 1959

2,901,051

TRACTOR DRIVE AND SUSPENSION MECHANISM

John L. Thibodeau, Melrose, Fla.

Application April 30, 1954, Serial No. 426,643

4 Claims. (Cl. 180—41)

This invention relates to land vehicles and more particularly to a tractor.

It is an object of this invention to provide a tractor particularly adapted for movement over rough terrain and marsh lands and swampy areas and which is operated under practically all conditions of weather.

It is another object of this invention to provide a self-propelled tractor capable of high tractor speeds and lacking in the high cost of track maintenance which is characteristic of the crawler type of tractor.

Yet another object of this invention is to provide a four-wheel drive unit with a drawbar pull equal to or exceeding that of a D-2 crawler tractor when operating under adverse ground conditions.

Another and still further object is the provision of a tractor which is small in size and capable of manufacture at a fraction of the cost of the crawler type tractors, yet capable of doing at least the equivalent amount of work and capable of operating in terrain and under weather conditions which render the operation of the crawler type tractor impossible.

Still another object of this invention is to provide a small size tractor in which there is a proper weight distribution existing between the forward and rear axles and the pay load is carried forwardly of the rear axle.

Still another object of this invention is to provide a tractor which assures traction by all four wheels being driven when going over stumps, logs or other obstructions, or when one or more of the wheels are in a depression such as a ditch, gully or rut.

Another and still further object is to provide a tractor in which there is a simple hand-switch power steering control to permit a minimum turning radius and which will enable an operator to work continuously over rough and rugged terrain with the minimum of manual effort required in steering the tractor.

Still another object of this invention is the provision of a tractor designed for the installation thereon of all types of attachments usually associated with tractor, such as plowing farm implements, trench diggers, etc.

Still another object of this invention is providing a tractor in which the load to be carried thereby may be easily adjusted to any height so as to easily and readily clear any objects, especially in the instance where the load is being dragged along the ground by the tractor with the front end of the load being raised above the level of the ground by an open rear end and arch carried on the frame of the tractor.

A still further object of this invention is to provide a tractor in which any one of the tractor wheels can be raised or lowered approximately sixteen inches out of line with the other three wheels before any one wheel is unable to provide support and traction. Thus, the tractor is adaptable for use as a light bulldozer and the specific feature whereby the wheels can be selectively raised, assists greatly when removing the tractor being used as a light bulldozer from stumps or hidden obstacles upon which the dozer blade may become stuck.

Another and further object of this invention is the provision of a four-wheel drive tractor in which each of the wheels are driven independently of the other wheels so that in the event of a break-down of any one wheel or the operating parts between the wheel and the drive, the tractor will be able to extricate itself and be self-propelled by the other independently driven wheels to enable the operator of the tractor to drive the tractor to a place of repair, thus eliminating the need for a maintenance and recovery crew from entering the area where the tractor is broken-down. This will obviously result in a great saving in maintenance and operating costs both in time and labor and also in the elimination of costly recovery equipment.

It is yet another object of this invention to provide a four-wheel drive tractor having a frame which is open at its back or rear making it possible for any pull down created by any attached implement such as plows, to be imparted directly on the rear tractor wheels thus giving the wheels more traction.

Still another object of this invention is to provide a tractor small in size, economical of operation, low in cost, and capable of pulling heavy loads over any type of terrain in all kinds of weather, also, which is capable of relatively fast speeds when not pulling a load and of a reasonable rate of speed when pulling a full load.

One of the major drawbacks in the development of natural resources in undeveloped country where terrain conditions are unfavorable for most types of self-propelled equipment, is the very high cost of the specialized and complicated machines required to operate in such difficult terrain and the cost in maintenance and repair of such equipment. In addition, many of the previously proposed self-propelled vehicles for such purposes are highly specialized and may be used only under one set of either terrain or weather conditions and would be totally inoperative where the terrain or weather conditions change. In this latter respect, attention is directed to the common types of crawler tractors or other track vehicles which become bogged down in swampy areas and must be retrieved therefrom by recovery crews after long and tedious labor requiring the efforts of many men and machines. To the end of overcoming the aforementioned basic problem, this invention provides a tractor which will operate under practically all conditions of weather and terrain, which is relatively simple in construction and economical in cost of manufacture and which will carry a pay load under good running speeds with a minimum of physical effort required on the part of the operator, and which will carry a relatively large pay load in proportion to the size of the tractor. Also, the tractor of this invention is particularly adaptable to numerous uses so that a number of different types of specialized and very costly equipment of this type can be eliminated thus reducing the cost of the operation in which the tractor is engaged. In other words, it is an all-purpose tractor of high adaptability.

Other objects and advantages will become apparent from a consideration of the following detailed description, forming the specification, taken in conjunction with the accompanying drawings, wherein.

With continued reference to the drawings, there is shown a tractor, generally indicated at 10, constructed in accordance with this invention and designed so as to economically operate under practically any adverse terrain condition and in any type of weather, and in addition, incorporates the several major elements comprising the tractor so fabricated as to cooperate to produce a tractor of high adaptability suitable for the number of different working operations, which is relatively light in weight and capable of doing the work in the terrain and under weather conditions hereinbefore mentioned equal to the work done by comparable tractors of many times its cost, and in addition, will be capable of greater speeds both when under load and when traveling free of the load. The tractor 10 is designed to answer a basic need in the development of natural resources in terrain which would normally prohibit the use of such machines wherein the cost of the such self-propelled tractors and other mechanical equipment is prohibitive in relation to the cost of the development of the resources.

The major elements of the tractor 10, cooperative to produce the results mentioned, may broadly be defined as a frame including a pair of spaced, longitudinally extending frame members 12 and 14 open at the back end of the tractor 10 with each of the frame members 12 and 14 having secured on the front end thereof respective frame extension bars 16 and 18 extending longitudinally therefrom for supporting the power plant 19 in the form of an internal combustion engine or motor, pairs of spaced front and rear wheels 20, 21 and 22, 23 are carried by the frame adjacent the ends thereof for rotation about horizontal axes, a transmission 24 which is operatively connected to the power plant 19 is carried by the frame intermediate its ends, a wheel drive means of the wheel sprocket and chain type for each of the wheels being operatively connected to the transmission 24 for imparting rotation to the wheels by transmitting the power developed by the power plant to each of the wheels thus providing a four-wheel drive for the tractor 10, a hydraulic power steering means, generally indicated at 26 operatively connected to the front wheels 20 and 21 for selectively rotating said wheels in concert about a vertical axis defined by the center line of a vertically disposed king pin 28 to effect directional movement or steering of the tractor 10, a hydraulic suspension means generally indicated at 30 operatively connected between the front wheels for automatically compensating for the difference in height between the axes of the front wheels from the ground surface due to obstructions encountered by either front wheel to maintain the frame level and free from stress due to the difference in height between the horizontal axes of the front wheels, and a sulky arch, generally indicated at 32, in the form of an A-frame adapted for attachment to a load to be transported by the tractor 10 with the arch mounted between the frame members 12 and 14 forwardly of the horizontal axes of the rear wheels 22 and 23 for movement in an arcuate path through the open back end of the frame so that the load to be transported will be disposed forwardly of the rear wheel axes to equally distribute the load on the tractor, and the arch 32 being operatively connected to the transmission 24 for moving the arch in its arcuate path to lift one end of the load attached thereto so as to clear obstacles on the ground surface.

*Frame and wheel drive*

Each of the frame members 12 and 14 are similarly constructed but disposed in opposite or opposed relation to each other as they extend longitudinally of the tractor 10. Since both of the frame members 12 and 14 are alike, only the frame member 12 will be described in detail and like parts on the frame member 14 will be identified by the same reference numerals identifying those parts of the frame member 12.

Figure 3:
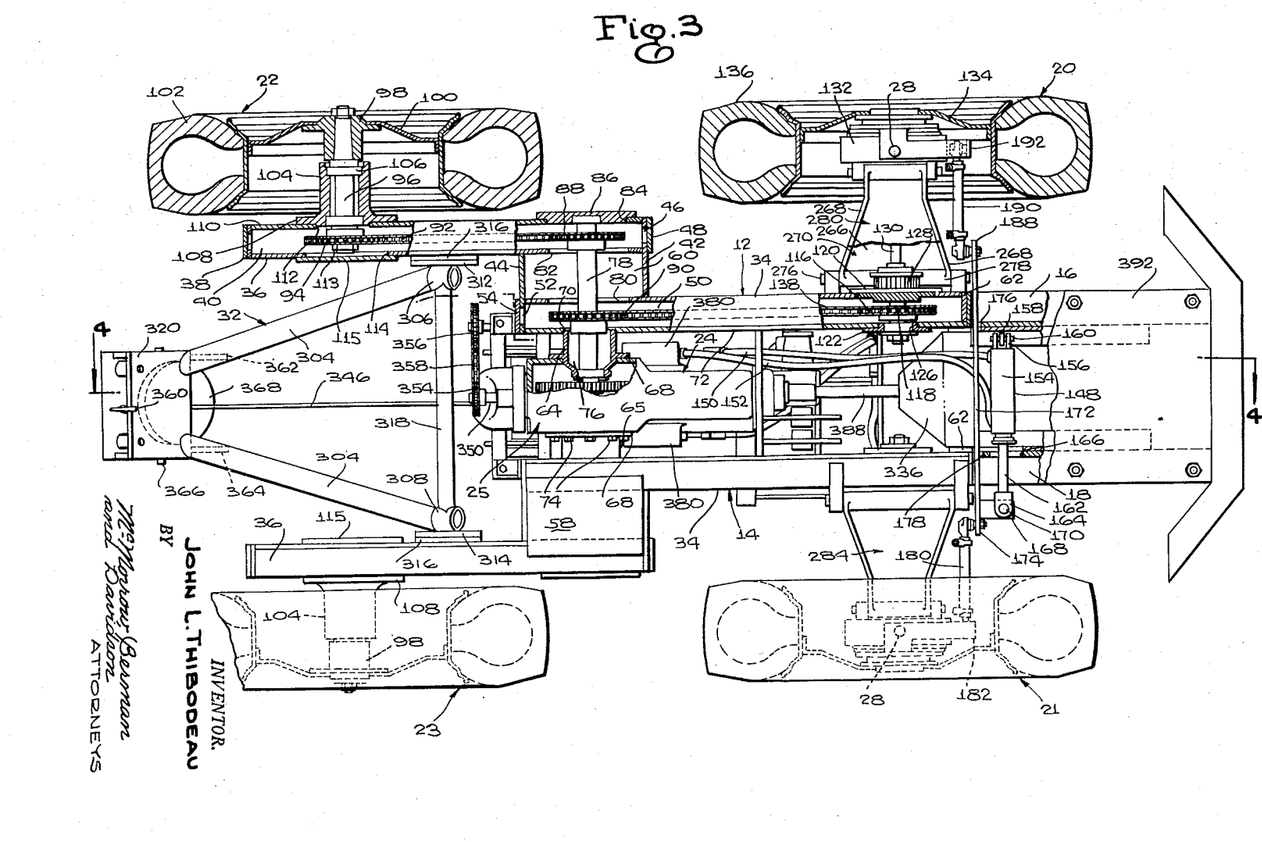
Figure 3 is a bottom plan view partially broken away to illustrate some of the operating parts thereof.
Figure 9:
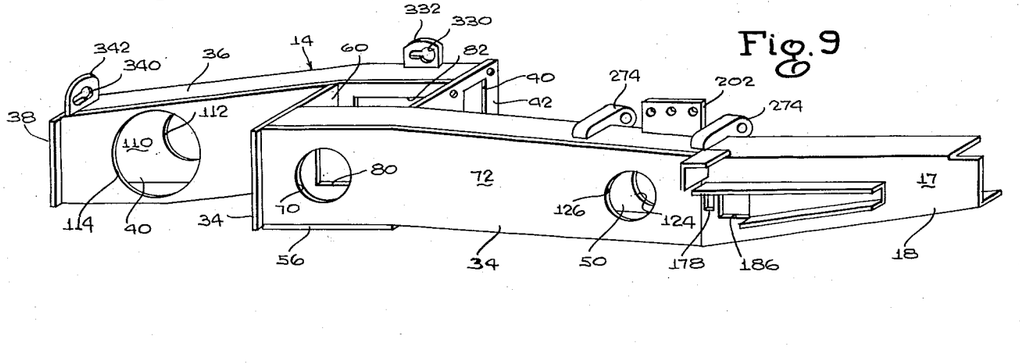
Figure 9 is a perspective view of one of the frame members.

With particular reference to Figures 3 and 9, the frame member 12 includes a pair of hollow box frames 34 and 36, the box frame section 34 defining the portion of the frame extending forwardly of the transmission 24 while the box frame section 36 extends rearwardly of the transmission 24. The box frame sections 34 and 36 are in spaced, generally parallel relation and have a hollow interior with each of the sections being generally rectangular in cross section so that a chamber is formed therewithin. An end plate 38 is welded onto the rear box frame section 36 to close the end of the chamber 40 formed therein remote from the transmission 24. The end plate is preferably welded to the end of the section 36 remote from the transmission 24.

The end of the box frame section 36 remote from the end plate 38 overlaps the end of the box frame section 34 remote from the frame extension bar 16 secured thereon. It will be noted that the sections 34 and 36 are in spaced relation and are secured in this overlapping spaced relation with the section 36 disposed outwardly of the section 34 in relation to the longitudinal center line through the tractor 10, by a pair of spaced parallel securing plates 42 and 44 extending between the respective frame sections and secured thereto as by welding. The securing plate 42 extends across the end of the chamber 40 remote from the end plate 38 and is provided with an access opening 46 therethrough opening in the chamber 40. A closing or end plate 48 is secured to the plate 42 as by bolting so as to removably close the access opening 46. The securing plate 44 extends across one end of the box frame section 34 remote from the extension bar 36 so as to enclose that end of the chamber 50 defined by the hollow interior of the section 34 except for the access opening 52 formed through the plate 44 and to the chamber 50 to permit inspection of the interior or chamber 50 of the member 34. The access opening 52 is closed by an end plate 54 as by being bolted upon the securing plate 44 so that the end plate 54 can be removed to permit access and inspection of the chamber 50.

A bottom wall in the form of a generally rectangular plate 56 extends between the securing plates 42 and 44 and is secured to the lower edges thereof as by welding so as to provide a closure therefor while a top wall plate 58 extends across the top edges of the securing plates 42 and 44 so that a totally closed chamber 60 is defined between the securing plates 42, 44 and the top and bottom wall plates 56 and 58. Thus, the box frame sections 34 and 36 of the frame member 12 are rigidly secured together.

The end of the chamber 50, remote from the end thereof closed by the welded plate 44 and bolted plate 54, is closed by a plate 62 extending across the end of the section 34 and secured thereto as by welding so that the chamber 50 is closed at both ends.

The transmission 24, and more specifically the differential portion generally indicated at 25 is carried between the sections 34 of the respective frame members 12 and 14 adjacent the ends thereof remote from the extension bars 16 and 18 by adaptor 64 extending outwardly from the differential housing 66 toward the box section 34 of the frame member 12 and a similar adaptor 65 extending outwardly from the differential housing in the opposite side thereof toward the box frame section 34 of the frame member 14. The adaptors 64 and 65 are provided intermediate their ends with an outwardly projecting annular flange 68 which is adapted to be welded on to the side of the housing while the end of the adaptors 64 and 65 remote from the opposite sides of the differential housing 66 from which they extend are undercut to provide an annular ring adapted to closely mate with and be secured within opening 70 of similar shape to the ring formed in the end of the adaptors 64 and 65, the opening 70 being provided in the side wall 72 of the respective box frame sections 34. As clearly shown in Figure 4, the adaptor 64 and the adaptor 65 are irregularly formed in peripheral outline so as to occupy a minimum amount of space. Thus, it will be seen that the differential portion of the transmission 24 is carried by the frame intermediate its ends, and it should be noted that the flange 68 is releasably secured on the respective opposite sides of the differential housing 66 by a plurality of bolts 74.

Figure 4:
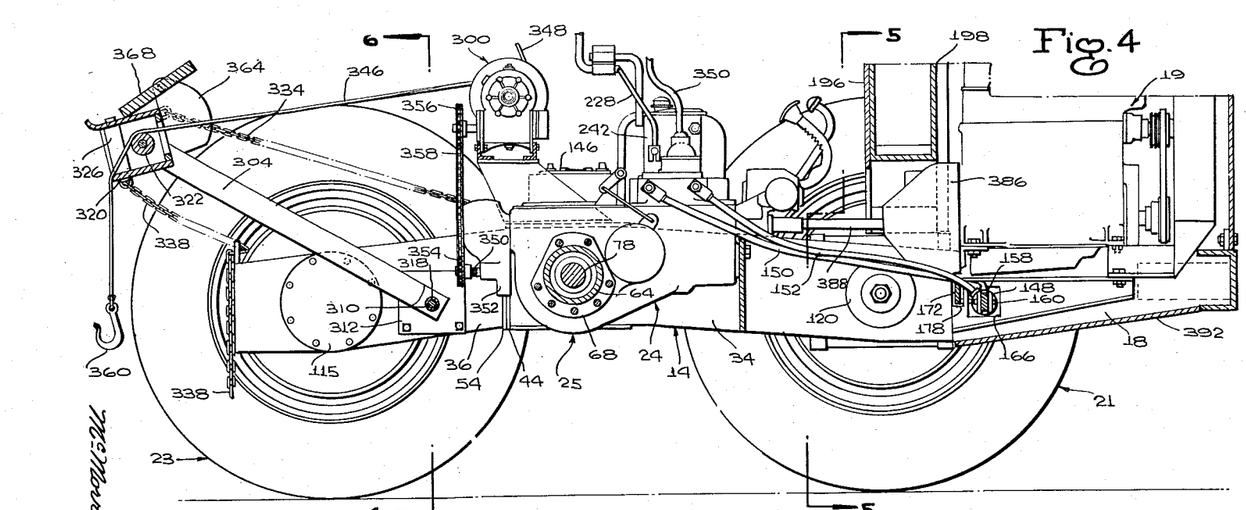
Figure 4 is a cross sectional view taken on line 4—4 of Figure 3.

The adaptors 64 and 65 are hollow defining a chamber 76 therein to receive therethrough the respective differential output shafts 78 which extend therethrough and through the opening 70 in the side wall 72 of the box frame sections 34 and thence through aligned openings 80, 82 and 84. The end of the output shaft 76 remote from the differential housing 66 is journaled in a plate 86 closing the opening 84. A pair of sprocket wheels 88 and 90 are rotatably carried on the output shaft 78 in spaced relation and may be secured thereon as by having a splined connection thereto or by having the hubs of the sprocket wheels carrying a set screw which will secure the sprocket wheels on the output shaft.

The sprocket wheel 88 is disposed within the chamber 40 of the box frame section 34 while the sprocket wheel 90 is disposed within the chamber 50 of the box frame section 36, and both sprocket wheels are mounted on the shaft 78 to rotate therewith. A chain 92 is trained around the sprocket wheel 88 and runs continually between the sprocket wheel 88 and a sprocket wheel 94 about which it is trained, the sprocket wheel 94 being in spaced relation to the wheel 88 and carried adjacent the end of the axle 96 of the rear wheel 22 and being disposed within the chamber 40 so as to be in longitudinal alignment with the sprocket wheel 88. The axle 96 carries thereon a wheel hub 98 upon which is mounted a wheel rim 100 upon which is carried a rubber tire 102 so that rotation of the differential output shaft 78 will be transmitted through the drive defined by the sprocket wheels 88 and 94 and the chain 92 to impart rotation to the wheel 22.

A cylindrical housing 104 has a central bore longitudinally therethrough through which the axle 96 extends, and the axle 96 is supported in a pair of spaced bearings 106 carried in the bore of the housing 104 adjacent opposite ends thereof to provide support for the axle 96 and to maintain its alignment. The housing 104 is further provided with a flange 108 which extends outwardly therefrom and perpendicularly thereto adjacent the end thereof remote from the hub 98 and adapted to be secured on to the side wall 110 of the box frame section 36 as by a plurality of bolts extending through the annular flange and into the side wall 110. The flange 108 is cut so as to provide a boss which is adapted to mate with the periphery of the opening 112 in the side wall 10 through which the axle 96 extends into the chamber 40, so that the opening 112 will be totally closed. An access opening 114, in axial alignment with the opening 112, is provided in the opposite side wall of the box frame section 36 so that the nut 113 which is threadingly received on the end of the axle 96 extending within the chamber 40 may be tightened so as to secure the sprocket wheel 94 upon the axle 96. The access opening 114 is closed by an access plate 115 secured to the side wall opposite the side wall 110 as by being bolted thereto.

It will be, of course, realized that the rear wheel 23 will be similarly driven from the transmission 24 and the differential 25, and the parts and elements identified in connection with the driving of the rear wheel 22 will be duplicated on the other side of the frame and will be disposed within the box frame member 36 of the frame member 14 to function in an identical manner. The parts and elements of the rear wheel drive shown and identified in connection with the drive of the wheel 22 will be used to identify the like parts in connection with the drive of the rear wheel 23. Thus, it will be seen that the rear wheels 22 and 23 are carried by the frame adjacent one end thereof for rotation about a horizontal axis, and each of the rear wheels 22 and 23 are individually and independently driven from the transmission 24 through the differential 25 by the drive means hereinbefore described.

Each of the front wheels 20 and 21 are also individually driven from the shafts 78 and the manner of attachment of each of the wheels to the frame as well as the means by which they are driven is identical for both wheels, hence, the mechanism used in connection with the front wheel 20 and its manner of connection to the frame will be described in detail, it being understood that the similar parts will be used in connection with the front wheel 21 and the same reference numerals identifying the like parts will be used in connection with both front wheels 20 and 21.

With continued reference to the mounting and drive of the front wheel 20, a sprocket wheel 116 is disposed within the chamber 50 of the box frame section 34 adjacent the end thereof closed by the plate 62 and is journaled for rotation upon a stub shaft 118 which is journaled in bossed flanges 120 and 122, the bosses of the flanges 120 and 122 snugly received in respective openings 124 and 126 in the opposite side walls of the section 34, the openings being in axial alignment. The end of the stub shaft extending through the opening 126 in the side wall 72 is externally threaded to carry a securing nut and a washer interposed between the nut and the adjacent face of the bossed flange 122. The other end of the stub shaft 118 is fitted with a universal joint 128 to which is operatively connected one end of a front wheel drive shaft 130, the other end of the drive shaft being operatively connected to the hub 132 of the front wheel 20. The hub 132 carries thereon a wheel rim 134 upon which is mounted a pneumatic type tire 136.

A sprocket chain 138 extends about the sprocket wheels 90 and 116 and moves in a continuous closed path around these sprocket wheels so that when the output shaft 78 is rotated by operation of the power plant 19 operatively connected thereto through the transmission 24, the stub shaft 118 will be driven so as to transmit rotational movement to the front wheel drive shaft 130 through the universal joint 128 to thereby cause rotation of the front wheel 20.

By virtue of the coupling of the front wheel drive shaft 130 to the driven stub shaft 118 by the universal joint 128, a flexible connection is effected between the drive and the front wheel to permit movement of the front wheel 20 transversely of the frame of the tractor.

From the foregoing, it will be apparent that the front wheels 20 and 21 are individually driven by a wheel drive means operatively connected to the transmission of the tractor for imparting rotation to the wheels, and each of the front wheels has a flexible connection with the wheel drive means.

With the front and rear wheels carried by the frame adjacent the ends thereof for rotation about a horizontal axis and individually driven by a wheel drive means, it will be observed that the openings in the box frame sections 34 and 36 are completely closed so that the chamber 40 of the section 36 is completely closed and is in communication with the chamber 60 defined between the connecting plates 42 and 44 and the top and bottom wall plates 58 and 56, so that the chamber 60 is in communication with the chamber 50 of the box frame section 34 through the opening 80, and the box frame section 34 has all of its openings completely closed when the wheels are mounted thereon in the manner hereinbefore described so that the chamber 50 is totally enclosed. Hence, the chambers 40, 60 and 50 define a closed reservoir within which a suitable lubricant may be poured so that the drive means for the respective wheels will be totally enclosed within the respective chambers and will continually run in a lubricant held within the reservoir defined by the chambers 40, 60 and 50 to insure continuous lubrication for the drive means as well as excluding dirt and other foreign material from the drive means so as to insure continuous uninterrupted operation and eliminate failure of the drive means due to dirt or other foreign substances. Thus, it will be seen that each of the frame members 12 and 14 has a reservoir extending longitudinally therethrough for holding a lubricant in which the wheel drive means will operate, and totally enclose the wheel drive means.

Hydraulic power steering

Power steering means incorporated into the tractor 10 as a major portion thereof, includes a hand switch 140 having an operating handle 142 which is resiliently biased, in a well known manner, to maintain the handle 142 in a neutral position and which will urge the handle toward the neutral position when the handle is moved to one side or the other of the central neutral position upon release of the hand pressure so moving the handle.

The hand switch 140 is of a well known type, such as the hand switch assembly KS–2070–A produced by the Oliver Corporation of Charles City, Iowa, as a part of their hydro-electric units provided with electro-magnetic operating cylinders. Thus, the hydromatic-electric unit will be of the type produced by the Oliver Corporation of Charles City, Iowa and will include a double-acting solenoid 144 electrically connected to the hand switch 140 and receiving the necessary electrical energy for actuating the solenoid by opertaion of the hand switch from a pair of storage batteries 146 through suitable electrical wiring, the batteries 146 being mounted on the top wall plates 58 extending across the top of the securing plates 42 and 44 and secured to the ends of the frame box sections 34 and 36 where they overlap. The electro-magnetic cylinder 148 is operatively connected to the solenoid 144 through the lines or conduits 150 and 152 extending therebetween. The barrel 154 of the cylinder 148 is provided at its closed end with a pair of spaced ears or lugs 156 projecting longitudinally therefrom to receive therebetween a lug 158 carried by and projecting outwardly from the side wall of the frame extension bar 16 in a direction toward the other oppositely disposed extension bar 18. The lug 158 is secured between the ears 156 by a pin 160 extending transversely through suitably aligned openings in the ears 156 and the lug 158 so that the cylinder 148 is pivotally mounted at its closed end. The piston rod 162 extending outwardly from the end of the cylinder 148 remote from the end carrying the ears 156 and movable in a reciprocating rectilinear path upon operation of the cylinder 148, carries at its distal end remote from the cylinder 148 a bifurcation 164. The piston rod 162, it will be noted, extends through an opening 166 provided in the side wall 17 of the frame extension bar 18 so as to be movable therethrough in its rectilinear path when actuated by the cylinder 148.

A flat, plate-like tongue 168 is received in the bifurcation 164 adjacent one end of the tongue and secured therein by a pivot pin 170 passing transversely therethrough and received in aligned openings in the legs of the bifurcation 164 and the tongue 168. The end of the tongue 168 remote from its connection to the bifurcation of the piston rod is secured on a drag link actuating bar 172 adjacent one end 174 thereof and the tongue 168 projects outwardly therefrom and perpendicularly thereto in a direction toward the front of the tractor 10. The bar 172 extends transversely across the frame of the tractor and will move in a rectilinear path through aligned openings 176 and 178 in the respective frame extension bars 16 and 18 in response to the action of the piston 148 and the piston rod 162 due to the operative connection between the bar 172 and the operating electro-magnetic cylinder 148.

Figure 7:
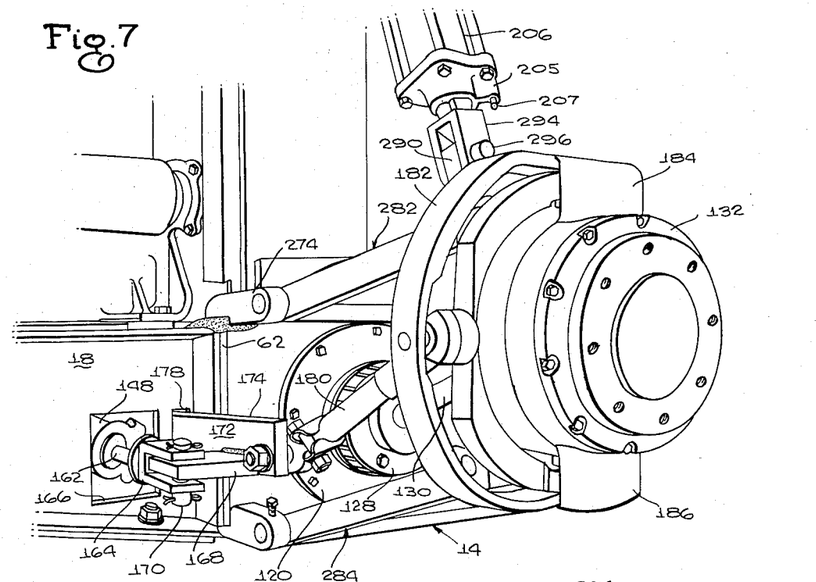
Figure 7 is a fragmentary perspective view of the forward end and one side of the tractor with the wheel and tire removed for clarity of illustration.

With particular reference to Figures 3 and 7, there is pivotally secured to the drag link actuating bar 172 adjacent the end 174 thereof, one end of a drag link 180. The other end of the drag link being pivotally connected at the proximate midpoint of a yoke 182 by a ball and socket arrangement. The free ends of the yoke are pivotally carried at opposite ends of the vertically disposed king pin 28, and the free ends of the yoke also carry thereon plates 184 and 186 which are secured on to the hub 134 so as to form a rigid connection thereto, the plates 184 and 186 may be secured upon the hub 134 as by welding.

The end of the bar 172 remote from the end 174, is designated at 188, and carries adjacent the end 188 means whereby a drag link 190, similar to the drag link 180, is pivotally connected thereto at one end thereof. The other end of the drag link 190 is connected by a ball and socket joint to a yoke 192 at its midpoint location. The yoke 192, is similar to the yoke 182, and is similarly pivoted upon opposite ends of the king pin 28 disposed vertically through the hub 134 of the wheel 20, and plates similar to the plates 184 and 186 rigidly connect the free ends of the yoke 192 to the hub 134 of the wheel 20.

The drag link actuating bar 172, in effect, defines a tie rod between the drag links 180 and 190 so that when the tie rod is moved in its rectilinear path, the wheels 20 and 21 will be rotated in concert about the vertical axes defined by the respective king pins 28.

Figure 1:
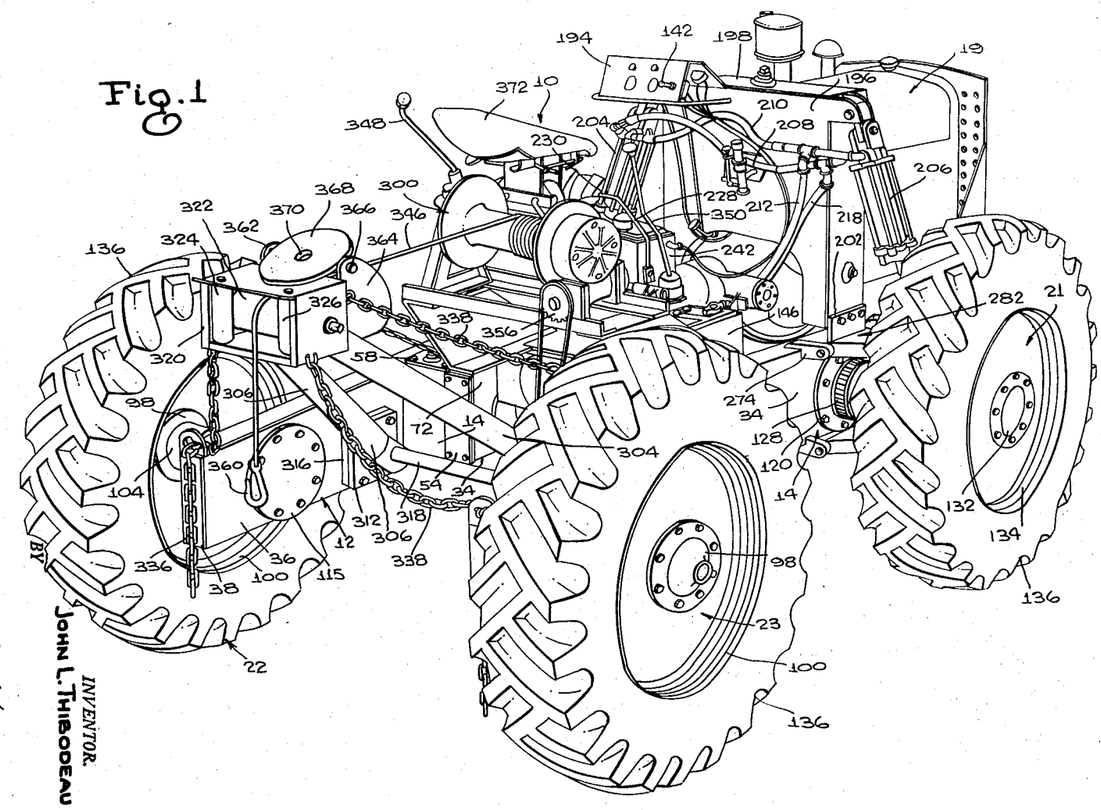
Figure 1 is a perspective view of the tractor embodying this invention and looking from the rear and one side thereof.
Figure 2:
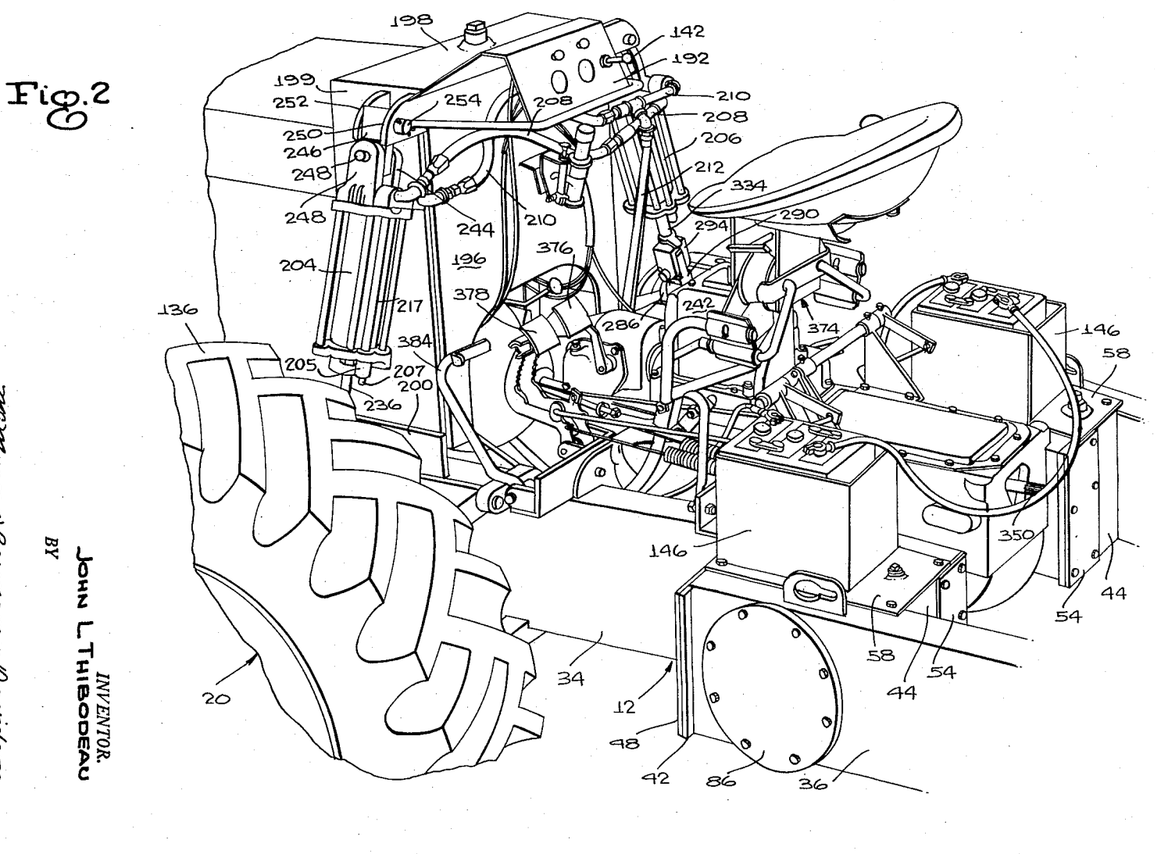
Figure 2 is a fragmentary perspective view of the tractor looking at the side thereof opposite to the side shown in Figure 1.
Figure 5:
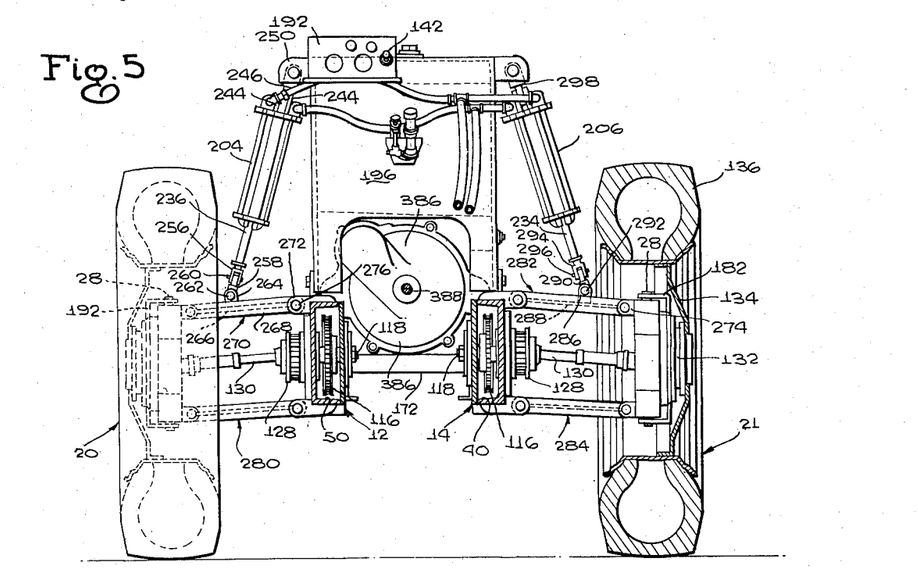
Figure 5 is a vertical cross sectional view taken on line 5—5 of Figure 4.
Figure 6:
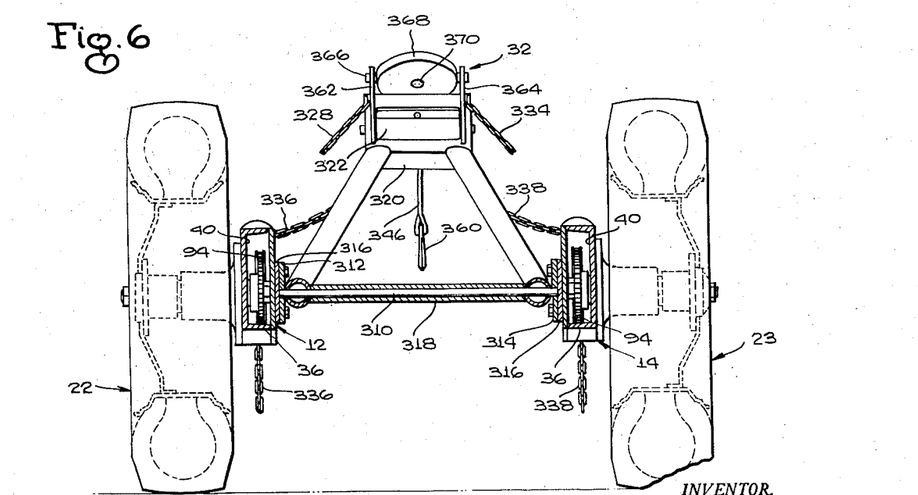
Figure 6 is a vertical cross sectional view taken on line 6—6 of Figure 4.

With particular reference to Figures 1, 2 and 5, it will be seen that the hand switch 140 carrying the operating handle 142 is mounted on an instrument panel 194 mounted on a generally rectangular mounting plate 196 fixedly carried on the side of a generally rectangular fuel tank 198 remote from the power plant or engine 19 with the fuel tank secured between the frame members 12 and 14 and between the vertically disposed mounting plates 200 and 202 respectively so as to extend transversely across the frame and perpendicular to the longitudinal axis of the tractor 10. The fuel tank 198 is rigidly secured to the plates 200 and 202 by a plurality of bolts.

From the foregoing, it will be apparent that upon movement of the operating handle 142 of the hand switch 140, the electro-magnetic cylinder 148 will be actuated through the solenoid 144 to cause rectilinear movement of the piston rod 162 in the desired direction, the movement of the piston rod 162 will be transmitted to the cross bar or tie rod 172 which in turn will cause the drag links 180 and 190 operatively connected between the tie rod and the respective front wheels 20 and 21 to cause rotation of the front wheels in concert about a vertical axis defined by the center line of the king pins 28, and thereby effect directional movement of the tractor 10. Thus, there has been shown and described a straight power steering mechanism simply operable by a single operating handle on a hand switch so that a minimum of effort is required on the part of the operator to effect the direction movement of the tractor 10. As previously pointed out, the operating handle will normally assume a central neutral position wherein the front wheels 20 and 21 are in a straightahead position so that when the operating handle 142 is moved either to the right or to the left to effect corresponding rotation in that direction of the front wheels, the operating handle will return to the central neutral position upon release of the hand pressure required to move it either to the right or to the left.

In actual tests conducted, it has been possible to teach an unskilled operator to operate the power steering mechanism and drive the tractor 10 in a very short time, after which he became quite efficient in maneuvering the tractor 10 in any desired direction.

*Front suspension*

The front suspension means or mechanism 30 operatively connected between the front wheels 20 and 21 for automatically compensating for the difference in height between the horizontal axes of the front wheels from the ground surface due to obstructions encountered by either front wheel to maintain the frame level and free from stress includes a pair of single-acting hydraulic cylinders 204 and 206, similar to the cylinder 148, but adapted for mechanical rather than electrical actuation. The inlet ends of the cylinders 204 and 206 are connected together through a line or conduit 208 while the outlet ends of the respective cylinders are connected together by a line or conduit 210. A line or conduit 212 is tapped into the inlet conduit 208 and has its other end connected into the valve 214 of a valve assembly, generally indicated at 216, while another line or conduit 218 has one end thereof tapped into the outlet line 210. The other end of the line or conduit 218 is connected into the valve 220 of the valve assembly 216. The valve assembly 216 is interposed between the inlet and outlet lines 212 and 218 and a sump 222 and connected to the sump 222 by a line or conduit 224 which has interposed therein between the valve assembly 216 and the sump 222, a pump 226 which is operatively connected into the electrical system of the tractor in a well known manner so as to be operative upon selective movement of the valve assembly operating rod 228 which carries a handle 230 at the end thereof remote from its connection to the longitudinally shiftable shaft 232 extending through the valve assembly 216. With the shaft 232 in the position shown in Figure 8, the cylinders 204 and 206 will be operatively connected together so that a movement of the piston in the cylinder 204 will cause a corresponding movement of the cylinder in the cylinder 206 to move the piston rod 234 in a direction opposite to the direction in which the piston rod 236 of the piston in the cylinder 234 moves. However, by moving the handle 230 and consequently the operating rod 228, the shaft 232 may be moved longitudinally of the valve assembly 216 so as to close either the valve 214 or the valve 220. As the shaft 232 is moved to the right as viewed in Figure 8, the valve 214 will be closed and the flow of the hydraulic fluid in the respective lines or conduits will have its normal direction of flow reversed so that fluid will be introduced through the normal outlet lines 218 and 210 into the outlet ends of the respective cylinders 206 and 204 to cause the respective piston rods 234 and 236 to move in a rectilinear path in a direction away from the cylinders. Movement of the selector shaft 232 in the opposite direction will in like manner cause the cylinders 204 and 206 to operate so as to move the piston rods 234 and 236 in a direction toward the respective cylinders. It is also possible, to effect the movement of either one or the other of the cylinders 204 and 206 by movement of the selector shaft 228 of the selector valve assembly 216 while pressing stem 207 of the cylinder which it is desired to lock so as to cause operation of one of the cylinders selected to effect movement of the associated piston rod in the desired direction.

Figure 8:
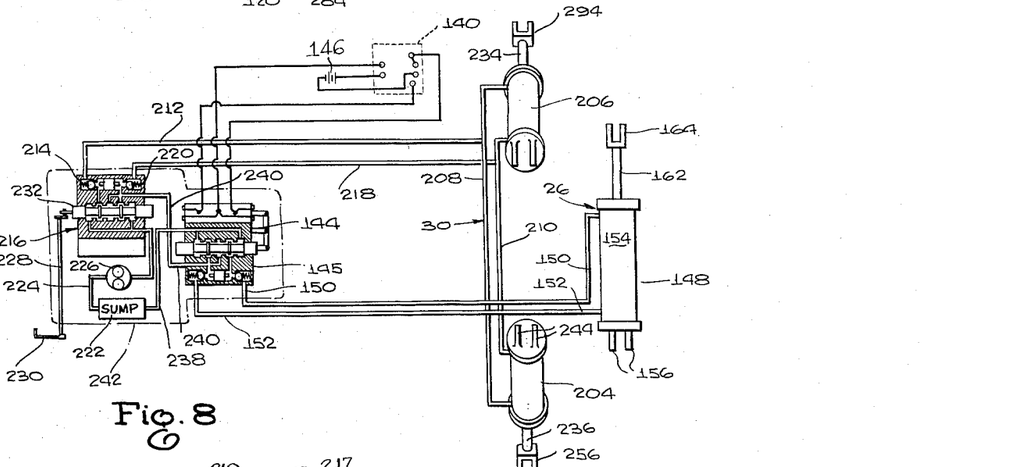
Figure 8 is a diagrammatic view of the hydraulic system employed in connection with the tractor.

In connection with the sump or reservoir 222 for the hydraulic fluid in the front suspension system, it will be seen, from a study of Figure 8, that the sump is also connected to the solenoid operated valve assembly 145 of the power steering system through a line or conduit 238. The valve assembly 145 is also connected into the valve assembly 216 through a line or conduit 240. The valve assembly 216, pump 226, sump or reservoir 222 and the solenoid 144 which operates the valve assembly 145 are all housed within a casing 242 bolted on top of the transmission casing or housing 66. Thus, it will be seen that there is one hydraulic system comprising integrally housed valve means whereby both the power steering means 26 and the suspension means 30 can be operated thereby.

The end of the cylinder 204 remote from the end through which the piston rod 236 extends is provided with a pair of spaced parallel ears 244 extending longitudinally therefrom and having aligned openings therethrough to receive the flattened end of a connector 246 and secured thereto by a pivot pin 248 while the heavier body portion of the connector 246 from which the flattened portion or tongue projects, is received between a pair of spaced parallel ears 250 and 252 and pivotally secured therebetween by a pin 254 extending transversely therethrough passing through registering openings in the body of the connector 246 and the ears 250 and 252 so that the connector 246 defines a flexible coupling connection between the ears 250 and 252 and the one end of the cylinder 204 and movement of the cylinder 204 will thus be permitted in right angular paths of movement. The ear 250 is preferably formed integrally with the mounting plate 196 at the upper end thereof and projects outwardly therefrom while the ear 252 is rigidly secured to the fuel tank 197 adjacent the top thereof and projects outwardly from the side wall 199 to which it is rigidly secured as by being welded thereto.

As best seen in Figure 5, the piston rod 236 carries at its end remote from the cylinder 204 a fork or bifurcation 256 for receiving between the legs thereof one end of a connector 258 and is pivotally secured thereto by a pin 260 extending transversely through aligned openings in the legs of the fork or bifurcation 256 and the part of the connector 258 received therebetween. The other end of the connector 258 is pivotally connected by a pin 262 extending transversely through aligned openings in a pair of spaced parallel lugs 264 carried upon the web portion 266 of a pair of spaced parallel arms 268, with the end of the connector remote from the fork 256 received between the lugs and the pin 260 passing through the portion of the connector received between the lugs. It will be noted, that the pin 262 extends transversely through the lugs 264 and the portion of the connector 258 received therebetween transversely thereof and in a direction disposed at right angles to the transverse direction of the pin 262, so that the piston rod 236 is pivotally mounted for movement in arcuate paths at right angles to each other with the pivot pins 260 and 262 as the respective axes.

The spaced arms 268 and the web 266 extending therebetween define an upper control member, generally indicated at 270. One end of the upper control arm or member 270 is received between outwardly projecting spaced ears 272, similar to and in transverse alignment with the pair of spaced ears 274 carried by the box frame section 34 of the frame member 14 as shown in Figure 9, and is carried on the corresponding box frame member 34 of the frame member 12. A transversely extending pivot pin or rod 276 extends through suitable aligned openings in the spaced ears 272 and through an aligned or registering bore through a pivot barrel extending transversely between the legs of the upper control member at the end thereof adjacent the frame so that the upper control member is pivotally mounted at one end to the frame for movement thereabout in a vertical arcuate path, the axis of movement being horizontally disposed longitudinally of the frame. The hinge barrel is designated at 278.

The other end of the upper control member or arm 270 is pivotally secured upon the hub 134 of the front wheel 20 by means of a hinge rod extending transversely through a bore in a barrel received between a pair of ears or lugs projecting from the hub 134 toward the frame of the tractor 10, or any other type of hinged connection may be employed, the one described merely being by way of an example. A lower control member or arm 280, formed similarly to the upper control member or arm 270 is disposed in spaced parallel relation to the upper control arm 270 and is hingedly connected at its opposite ends to the lower longitudinal edge of the frame and to the lower end of the hub of the wheel 20, in a manner similar to the manner in which the upper control arm 270 is connected between the frame and the front wheel. Thus, the upper and lower control arms 270 and 280 define a portion of the means operatively connecting the front wheel to the hydraulic suspension system. Thus, the upper and lower control arms 270 and 280 will constitute a parallelogram linkage operatively connecting the front wheel 20 to the frame member 12, and the control arms will move in concert in parallel arcuate paths about hoizontal axes in response to the operation of the hydraulic control cylinder 204.

A similar pair of upper and lower control arms, generally indicated at 282 and 284 respectively, preferably identical with the upper and lower control arms 270 and 280, define a parallelogram linkage operatively connected between the frame member 14 and the front wheel 21 and pivotally connected therebetween for movement in concert in parallel arcuate paths about horizontal axes. The upper control arm 282 carries a pair of spaced parallel ears 286 on the web 288 extending between the spaced arms of the upper control arm 282, the ears 286 being carried intermediate the ends of the web 288 and provided with aligned apertures therethrough to receive therebetween one end of a connector 290 and having the connector 290 pivotally connected therebetween by a pivot pin 292 extending transversely of the web 288 and through the aligned apertures in the ears 286 and through a registering opening in the portion of the connector 290 received between the ears. The other end of the connector 290 is received between the legs of a fork or bifurcation 294 formed on the end of the piston rod 234 remote from the cylinder 206. The fork 292 is pivotally connected to the end of the connector 290 received therein by a pin 296 extending transversely through registering openings in the legs of the fork and the end of the connector received therein. It will be noted that the pins 292 and 296 extend in transverse relation to the parts which they pivotally connect and are disposed in right angular relation with respect to each other so that the end of the piston rod is capable of movement in arcuate paths about the respective pins 292 and 296 as axes which are at right angles to each other. Thus, it will be seen that the piston rod 234 associated with cylinder 206 is operatively connected to the parallelogram linkage defined by the upper and lower control arms 282 and 284 so that upon operation of the hydraulic control cylinder 206, simultaneous movement will be imparted to the upper and lower control arms and transmitted or translated into vertical movement of the front wheel 21.

The end of the hydraulic control cylinder 206 remote from the end through which the piston rod 234 extends, is pivotally connected to the fuel tank 198 and the mounting plate 196 secured thereto by a connector 298 in the same manner as the corresponding end of the hydraulic control cylinder 204 is connected or carried by the fuel tank, so that the pivotal connection afforded by the connector 298 is equivalent in its operation to that of a universal joint permitting movement of the connected end of the cylinder 206 in arcuate paths normal to each other.

From the foregoing, it will be apparent that the hydraulic suspension means 30 is operatively connected between the front wheels 20 and 21 and will automatically compensate for the difference in height between the horizontal axes of the front wheels from the ground surface when either of the wheels encounter an obstacle or a hole since the hydraulic control cylinders 204 and 206 are normally interconnected so that the movement of one of the cylinders in one direction will cause operation of the other cylinder in the opposite direction, and thereby maintain the frame level and free from stress since the normal torque which would be transmitted to the frame by the front wheels encountering an obstruction which it must go over or falling into a rut or hole, will be taken up by the compensation of the difference in the corresponding movement of the respective control cylinders so that the front wheels are always in contact with the ground. It will be appreciated, that elevation of or depression of either front wheel will transmit this movement through the associated parallelogram linkage to the control cylinder operatively connected thereto, and will be transmitted to the other of the control cylinders operatively connected with the other front wheel so as to insure contact of the other front wheel with the ground surface as well as taking up the torque or stress which would otherwise be normally transmitted to the tractor frame.

In addition, as previously pointed out, each of the control cylinders 204 and 206 may be selectively operated by movement of the handle 230 of the operating rod 228, to raise or lower the selected front wheel so that either front wheel may be selectively raised out of contact with the ground surface, or both control cylinders 204 and 206 may be selectively operated simultaneously to actuate the respective parallelogram linkages and cause the frame to be raised with respect to the horizontal axes of the front wheel. This latter feature is especially valuable in the event that the tractor must traverse shallow bodies of water, such as when fording, to maintain the power plant 19 above the level of the water to prevent cessation of its operation due to immersion. Also, it has been found through experimentation, that the tractor 10 may travel along the bed of small streams when the front end of the tractor is raised by operation of the suspension means in the manner hereinbefore indicated, to thereby avoid traversing otherwise inpenetrable wooded area or areas where there is an over abundance of closely growing vegetation. Since the wheel driving means, as well as the transmission and differential, are totally enclosed, there will be no injury thereto by immersion in water through which the tractor may be operated. The tractor 10 has been successfully operated in depth of water of approximately five feet.

Also, it will be evident that one of the front wheels may pass over a relatively high obstacle without either having the other front wheel lose contact with the ground, or result in a tilting of the tractor frame and consequently a tilting of the tractor with the attendant dangers of overturning. The same result is achieved when either of the front wheels drops into a hole or rut or other depression along its path of travel.

It will be understood that the roll position, as distinguished from pitch and yaw position, of the tractor frame is established by the rear wheels which are rigidly suspended or attached to the frame. If the front wheels were spring suspended and the left front wheel met a raised obstacle, the right front and left rear wheels of the vehicle would have load removed therefrom, and additional load would be carried by the left front and right rear wheels. The result would be that driving contact with the ground would be reduced for the right front and left rear wheels. The amount of weight supported by the two right wheels, however, would remain approximately equal to the amount supported by the two left wheels unless the vehicle were tilted or rolled far to one side.

Crawler treaded vehicles tend to take advantage of the generally substantially equal distribution of weight between the two sides of the vehicle, as do certain four wheel drive arrangements. Crawler type vehicles are, of course, relatively slower, heavier and more expensive than wheeled vehicles, while suspension systems heretofore suggested for four-wheel drive vehicles have permitted one or the other diagonal pair of wheels to lose traction when one wheel raises over or falls into an obstruction.

In the present system, there is substantially no change in the weight supported by any of the wheels when a raised obstruction or a depression is encountered by any one or more of the wheels, and consequently there is no appreciable change in the tractive effort of each wheel.

Further, the cylinder 204 and 206 are each provided with a follow-up selector valve adjacent the ends thereof attached to the respective control members 280 and 284, the stem 207 of the valves (see Figure 7) contained within a valve housing 205, one on each cylinder, which makes possible manual manipulation to selectively determine any desired position of a respective cylinder. The plunger-like stem or button 207 may be pushed inwardly and will cause the valve in the housing 205 to lock the associated cylinder at the selected position. For example, by locking the cylinder 204, on the left side of the vehicle as viewed in Figures 1 and 2, in the uppermost position and by operating the main cylinder actuating valve 214 so that the opposite cylinder 206 will move in the opposite direction, the wheel on the right hand side may be raised approximately fourteen inches, therefore, making it possible to run the tractor on three wheels if so desired in the event of a flat tire or broken wheel or any case where the wheel may be bogged down and jacking it up is desired to chock it with planks or other objects to give better flotation. The valves within the housings 205 on each of the cylinders and the plunger button or stem 207 therefor are normally commercially produced in connection with cylinders similar to cylinders 204 and 206 employed on the present tractor.

Figure 8A:
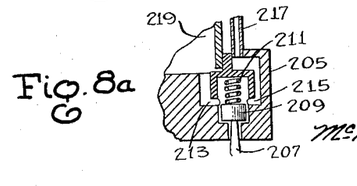
Figure 8a is a sectional fragmentary view on much enlarged scale showing details of follow-up selector valves associated with front wheel suspension cylinders of the tractor.

As shown in Fig. 8a, the selector valve within the housing 205 of each of cylinders 204 and 206 comprises a movable piston 209 attached to button 207 and spring loaded by spring 211 into an open position to permit communication between ports 213 and 215, port 213 being in communication with the interior of the cylinder 219, and port 215 communicating with line 208 through a pipe such as pipe 217 shown in Fig. 2. Manual raising of button 207 of one of cylinders 204 or 206 will prevent the transfer of fluid into or out of that cylinder, while operation of handle 230 will cause the desired supply of fluid to and from the other cylinder to raise or lower the wheel controlled thereby.

*Load handling means*

The load handling means of the tractor 10 includes the sulky arch 32 and the winch, generally indicated at 300. The sulky arch 32 is in the form of an A-frame having a pair of divergent legs 302 and 304, each of the legs having their most divergent ends bent laterally out of the plane of the longitudinal center lines thereof to define collar portions 306 and 308 respectively which are bent toward each other and form an obtuse angle with the major portion of the legs. Each of the collars 306 and 308 is provided with an opening tranversely therethrough to receive therein a shaft 310 extending therebetween transversely across the open back end between the frame members 12 and 14 to permit arcuate movement of the frame or arch 32 in a vertical arcuate path through the open back end of the frame about the horizontal axis defined by the center line of the shaft 310. The opposite ends of the shaft 310 are journaled in respective bearing plates 312 and 314, each of the bearing plates being detachably mounted upon a plate 316 carried on the respective members 12 and 14 of the frame and may be secured thereon as by being welded thereto. The shaft 310 is disposed within a tubular bar 318 and is journaled in the frame of the tractor, as indicated in Figure 3, the shaft and its surrounding bar 318 are positioned forwardly of the horizontal axes or axles 96 of the rear wheels 22 and 23 and closely adjacent the transmission housing 66. The tubular bar 318 encirclingly surrounds the shaft and is secured to the collars 306 and 308 at its opposite ends so as to extend therebetween and form the base of the A-frame. It will be noted that the collars 306 and 308 are disposed so as to be closely adjacent the respective bearing plates 312 and 314.

The legs 302 and 304 may be tubular, and carry at their converging ends remote from the base 318, a generally rectangular housing 320 having open front and rear sides and having a roller 322 journaled in the opposite end walls of the housing so as to be rotatably mounted therewithin and extend thereacross, and also has journaled for rotation therein a pair of spaced parallel guide rollers 324 and 326 and extending between the top and bottom walls of the housing adjacent the open rear side, or the side remote from the legs 302 and 304 which are secured to the housing 320 adjacent the front or opposite open side as by being welded to the bottom wall of the housing.

A link chain 328 has one end thereof secured to the housing 320 adjacent the top of the end wall thereof adjacent the wheel 22 and the chain is adapted to be secured at selected points along its length in a key hole slot 330 formed in an upstanding lug 332 secured on the box frame section 36 of each of the frame members 12 and 14 adjacent the end thereof which overlaps the box frame section 34. In the case of the length of the chain 328, it may be selectively secured at desired locations along its length remote from the housing 320 in the key hole slot in the upstanding lug 332 carried on the frame member 12. A similar length of chain 334 to the length of chain 328 is secured at one end to the end wall of the housing 320 adjacent the top thereof and on the end wall opposite to that which the one end of the chain 328 is secured. The link chain 334 is adapted to be received in the key hole slot 330 of the upstanding lug 332 formed on the frame member 14, the lugs 332 on the respective frame members being transversely aligned. Thus, the lengths of chain 328 and 334 will extend forwardly, that is toward the engine or power plant 19 of the tractor, and downwardly to be secured in the respective lugs 332 on the frame members 12 and 14. Thus, the arch or frame 32 may be secured in a desired position in its arcuate path of movement through the open end of the frame by having the chains 328 and 334 secured in the slot in the upstanding lugs 332. This will prevent further movement of the frame or arch 32 in its arcuate path in one direction away from the winch 300 so that any desired angular relation between the legs of the arch or frame may be selected with respect to the longitudinal axis of the frame of the tractor and secured in that position against movement in one direction.

Another pair of chain lengths 336 and 338 are secured at one end to the opposite side walls of the housing 320 adjacent the lower ends thereof, and the links of the chain remote from the housing 320 may be selectively secured in a key hole slot 340 formed in an upstanding lug 342 formed at the end of the box frame sections 36 of the respective frame members 12 and 14 remote from the end thereof adjacent which the lugs 332 are secured. The lugs 342 extend transversely across the top of the respective box frame members 36. Thus, with the chains 336 and 338 secured in the key hole slots of the lugs 342 as shown in Figures 1 and 4, there will be some slack in the length of chain between the lugs 342 and the ends of the chains connected to the housing 320. However, it is possible to have the chains 336 and 338 extend in a torque condition between the housing 320 and the lugs 342 to thus prevent movement of the arch or frame 32 in its arcuate path in a direction opposite to that restrained by the chains 328 and 334 to thus fixedly secure the frame or arch in a selected position in its arcuate path of movement.

The winch 300 is mounted for rotation about a horizontal axis transversely of the frame of the tractor upon a support structure, generally indicated at 344, and is adapted to reel in a cable 346 which has been payed out therefrom when the winch operating handle 348 has been moved to a position whereby the winch 300 will be drivingly connected to the power take-off 350 of the transmission 24 and extending through the differential housing 66 and the power take-off housing 352 with the power take-off 350 carrying a sprocket wheel 354 which is drivingly connected to a sprocket 356 by a sprocket chain 358 trained about the sprocket wheels to run in a continuous path. The cable 346 passes through the open sides of the housing 320 and overlies the roller 322. The end of the cable remote from the end secured to the drum of the winch 300 carries thereon a hook 360 which is adapted to engage with cables or ropes secured about a load to be handled.

The open back end of the frame through which the arch or frame 32 moves in a vertical arcuate path may receive a considerable portion of the load to be carried therebetween so that the load may be carried forwardly of the axles of the rear wheels and thus provide equal distribution of weight upon the tractor 10 and increase its ground surface traction. Also, the end of the load to be carried may be raised to a selected height above the ground so that the forward end of the load, in the case where the load is being dragged, will be raised so as to clear obstacles along the ground in the path of travel of the tractor 10.

The end of the load to be handled which is connected to the winch cable 346 may be selectively raised by reeling in the cable 346 on the drum of the winch 300, and the cable will ride over the roller 322 to assist in the winding operation. The guide rollers 324 and 326 have been provided so that in the event that the tractor is being turned by the power steering means, the cable will ride against the guide roller adjacent the side to which the tractor is being turned to thereby prevent damage to the cable.

The housing 320 carries thereon a pair of vertically spaced bracket plates 362 and 364. The plates 362 and 364 are secured to the housing 320 along the open front side, or the side adjacent the winch 300, and projects forwardly therefrom. A portion of the plates 362 and 364 extends vertically beyond the top of the housing 320 and carries in this upwardly extended portion an arbor 366 journaled adjacent its opposite ends in the respective plates and extending therebetween. A fifth wheel 368 having a central aperture 370 therethrough is secured on the arbor 366 between the bracket plates 362 and 364 for connection to a mating portion of a trailer, not shown, so that the tractor 10 may become a prime mover for a tractor which may be connected to the fifth wheel 368 carried on the arch or frame 32.

It will be apparent, that the fifth wheel 368 may be selectively adjusted in respect to the height above the ground surface so that it will have a universal application to any tractor having a mating fifth wheel element regardless of the height of the mating fifth wheel element of a trailer to be attached thereto from the ground surface.

By lowering the arch or frame 32 to a substantially horizontal position, the frame will define a draw-bar for the tractor 10 to which a load to be transported may be secured or to which various agricultural attachments may be secured.

From the foregoing, it will be seen that the load handling means carried by the frame of the tractor will be capable of handling diverse types of loads and will be adapted for having attached thereto various implements normally associated with tractors for doing various types of soil turning work.

The open frame makes it possible for the pull down created by any attached implement, such as plows, to be transmitted directly on the rear tractor wheels 22 and 23 giving the tires 136 more traction.

*Operation*

The operator of the tractor 10 will be supported in the seat 372 and face the instrument panel 194, the seat 372 being supported on a suitable bracket structure, generally indicated at 374, carried by the tractor frame and extending vertically upwardly therefrom. With the operator thus seated, his feet will be in a position to rest upon the brake pedals 376 and 378 which are independently operable and operatively connected to the differential brakes within the brake housings 380 and 382 to bring the tractor 10 to a halt or to reduce the speed of the tractor in the normal course of driving operations. One of the operator's feet may rest upon the clutch pedal 384 operatively connected to the clutch housing 386 so that the power of the engine 19 may be transmitted therethrough to the drive shaft 388 and thence into the transmission 24. One hand of the operator may be used to operate the gear shift lever 390 for shifting the gears in the transmission 24 to produce the required gear ratio in propelling the tractor in a given direction. Also the handle 230 of the operating rod 228 for controlling the front wheel suspension selectively is within easy reach of one hand of the operator while the operating handle 142 for the power steering system is convenient to the hand of the operator for effecting the directional movement.

The winch operating handle 348 is also disposed in a convenient location with respect to the operator in the seat 372 for selectively operating the winch from his seated position.

In using the tractor 10, it will be possible to employ the various features of the arch or frame 32 to handle a load in any manner desired and to attach the load thereto for transport thereof. The steering of the tractor 10 is easily accomplished without undue strain of the operator by merely moving the lever 142 to the right or to the left while if the operator so desires, in order to ford a stream, he may selectively raise the front end of the frame by moving the operating rod 228. In connection with fording a stream, it will be noted that the tractor is provided with a belly plate or pan 392 secured to the frame bar extensions 16 and 18 and extending therebetween below the engine or motor 19 to prevent water from splashing upwardly into the motor or engine to cause faulty operation.

*Summary*

From the foregoing, it will be apparent that there has been provided a tractor of novel construction and operation in its entirety and which comprises a frame which includes a pair of spaced frame members 12 and 14 open at the back end, pairs of spaced front and rear wheels 20, 21 and 22, 23 carried by the frame adjacent the ends thereof for rotation about horizontal axes, extension bars 16 and 18 with one of each of the frame extension bars carried on each of the frame members 12 and 14 and extending longitudinally from the front end thereof for supporting a power plant or engine for the tractor, a transmission 24 operatively connected to the engine and carried by the frame, a wheel drive means for each of the wheels operatively connected to the transmission for imparting rotation individually to each of the wheels, a hydraulic power steering means 26 operatively connected to the pair of front wheels 20 and 21 for selectively rotating the wheels in concert about vertical axes to effect directional movement of the tractor, a hydraulic suspension means 30 operatively connected between the front wheels for automatically compensating for the difference in height between the horizontal axes of the front wheels from the ground surface due to obstructions encountered by either front wheel so as to maintain the frame level and free from stress and torque, and an arch as an element of a load-handling means mounted between the frame members 12 and 14 forwardly of the horizontal axes of the rear wheels 22 and 23 for movement in an arcuate path through the open back end of the frame so that the load to be transported will be disposed forwardly of the horizontal axes of the rear wheels to equally distribute the load on the tractor and increase the traction of the rear wheels, the arch 32 being operatively connected through the winch 300 and cable 346 selectively wound thereon to said transmission for moving the arch in its arcuate path to lift one end of the load so as to clear any obstacles on the ground surface as the tractor proceeds in its path of travel.

The tractor 10 includes a hydraulic system to which the power steering means 26 is operatively connected into, and the power steering means being also operatively connected to the front wheels 20 and 21 for selectively rotating the wheels simultaneously about vertical axes to effect directional movement of the tractor, the hydraulic suspension means 30 also being operatively connected into the hydraulic system of the tractor and between the front wheels to automatically compensate for the difference in height between the horizontal axes for either front wheel. In connection with the hydraulic suspension means 30, it will be noted that this means comprises a pair of hydraulic cylinders operatively connected together and connected into the hydraulic system of the tractor, a pair of upper and lower control arms extending between each of the front wheels and the tractor body, more specifically, the frame member adjacent the associated front wheel, for movement in parallel vertical arcuate paths with each of the pairs of arms 270, 280 and 282, 284 being operatively connected to one of the control cylinders 204 and 206 respectively, and the respective pairs of control arms being responsive to the operation of the associated cylinders 204 and 206 to move the pairs of control arms in their arcuate paths to thereby automatically compensate for the difference of height between the horizontal axes of the front wheels due to an obstruction encountered by either one of the front wheels. Also, there is provided manually operable means in the form of the valve operating rod 238 which is operatively connected to the suspension means 30 through the hydraulic system of the tractor whereby selective operation of either or both of the cylinders 204 and 206 may be obtained to move the associated control arms in their arcuate paths.

With regard to the load handling means carried by the frame, this means not only includes the arch 32 mounted forwardly of the horizontal axes of the rear tractor wheels for movement in a vertical arcuate path through the open end of the frame, but also includes means for securing the arch 32 in a selected position in its arcuate path of movement, the securing means being defined by the lengths of link chain 328, 334 and 336, 338. Also, the load handling means includes a selectively operable reel in the form of a winch operatively connected to the power take-off of the tractor, a cable 346 connected at one end to the reel means for winding thereon, the cable being supported on the arch 32 for sliding movement therethrough by passing over the roller 322, the other end of the cable having a hook 360 adapted for attachment to a load to be handled. In addition, the load handling means, and more particularly the arch or frame 32 carries thereon a fifth wheel 368 for attachment to a mating element on a trailer so that it may be attached thereto so that the trailer may be transported by the tractor acting as a prime mover.

The power steering mechanism or means 26 generally comprises drag links 180 and 190 with one of the drag links provided for one of the front wheels and one end of the drag link associated with a front wheel being pivotally secured thereto, a hydraulic cylinder 148 operatively connected into the hydraulic system of the tractor and to the other end of each of the drag links through the tie rod or cross bar 174 so that the drag links are responsive to the operation of the cylinder 148 to simultaneously move and cause rotation in concert of the front wheels 20 and 21 about vertical axes defined by the center line of the king pins 28.

The tractor 10 has been particularly adaptable for use in logging operations where the logs to be gathered are to be used for pulp wood or lumber, and wherein the terrain to be traversed in the logging operation is normally rough and irregular and in many cases quite swampy, crisscrossed with numbers of small shallow streams, also the areas in which such operations take place are normally heavily wooded and remote from paved roads or secondary unpaved roads. Thus, by use of the tractor of this invention, it will be possible to conduct such operations with a minimum of trails being cut into the area of operations and which will speedily accomplish the required work with a minimum of effort by the operator, and the tractor itself requiring a minimum of maintenance and capable of being produced at relatively low cost in comparison to comparable machines for the same purpose.

The tractor 10 is, as will be readily appreciated, adaptable for any other uses as a prime mover, agricultural machine, and with the addition of suitable attachments, as an earth moving machine. Hence, the tractor 10 is of wide versatility and adaptable for many uses within a given area thus eliminating the need for a number of specialized machines of complicated construction requiring a great deal of maintenance and which are very costly.

While there is shown and described the preferred embodiment of the invention, it is to be understood that the structure is susceptible to change and modification within the practicability of the invention and therefore should be limited only by the scope of the claims appended hereto.

What is claimed is:

1. A hydraulic liquid system for a four-wheeled tractor, comprising a suspension means operatively connected into said system and between the front tractor wheels to automatically compensate for difference in height between horizontal axes of the front wheels from the ground surface due to an obstruction encountered by one of the front wheels to maintain a substantially equal distribution of weight between said front wheels, said front wheel suspension means comprising a pair of hydraulic cylinders operatively connected together and into said system, a pair of upper and lower control arms extending between each of said front wheels and the tractor body for movement in parallel vertical arcuate paths, and one arm of each said pair of arms being operatively connected to a respective one of said cylinders, said pairs of control arms responsive to the operation of the cylinders to move in their arcuate paths to automatically compensate for the difference of height between the horizontal axes of the front wheels, and manually operable means carried by the tractor and operatively connected to said suspension means for selectively causing operation of said cylinders to move the associated control arms in their arcuate paths.

2. In a tractor comprising a power plant, a differential, a respective driven shaft extending from opposite sides of said differential, a frame, and a front and a rear wheel on each side of said frame, respective drive means interconnecting the front and rear wheel on each side for driving together at the same speed and connecting each said interconnected front and rear wheel with a respective said shaft, said rear wheels being rigidly suspended to said frame, and a respective hydraulic liquid cylinder suspending each said front wheel, said cylinders being interconnected to equalize hydraulic liquid pressure therebetween.

3. In a tractor having a frame, a power plant and differential gears operatively connected to the power plant, a pair of wheels rigidly suspended to said frame at one end thereof, a second pair of steerable wheels at the other end of the frame, respective arm means mounting the wheels of said second pair for vertical movement with respect to said frame, respective hydraulic cylinder means connected between each said arm means and said frame controlling the height of said frame with respect to the respective wheel, means interconnecting said cylinder means providing free hydraulic fluid exchange therebetween thereby to equalize the weight carried by said wheels of said second pair, first drive means drivingly interconnecting the right hand wheels of said pair, second drive means drivingly interconnecting the left hand wheels of said pairs, each said drive means comprising a respective shaft connected differentially by said gears to said power plant.

4. The combination according to claim 3 wherein said cylinder interconnecting means comprises means to supply pressure fluid to said cylinders and manual control means for said supply means operative selectively to raise or lower the frame with respect to the wheels of said second pair.

References Cited in the file of this patent

UNITED STATES PATENTS

| | | |
|---|---|---|
| 1,118,528 | Bruce | Nov. 24, 1914 |
| 1,314,093 | Pifer | Aug. 26, 1919 |
| 1,690,372 | Livesay | Nov. 6, 1928 |
| 1,828,841 | Kingsley | Oct. 27, 1931 |
| 2,100,561 | Kliesrath | Nov. 30, 1937 |
| 2,134,515 | Hoskyns | Oct. 25, 1938 |
| 2,148,781 | Smith | Feb. 28, 1939 |
| 2,165,617 | Paes et al. | July 11, 1939 |
| 2,228,413 | Smalley | Jan. 14, 1941 |
| 2,249,356 | Goodman | July 15, 1941 |
| 2,278,081 | Kramer | Mar. 31, 1942 |
| 2,312,769 | Mosling | Mar. 2, 1943 |
| 2,400,803 | Barnhart | May 21, 1946 |
| 2,403,325 | Armington | July 2, 1946 |
| 2,415,026 | Brown | Jan. 28, 1947 |
| 2,426,938 | Langley | Sept. 2, 1947 |
| 2,427,340 | Allison | Sept. 16, 1947 |
| 2,429,746 | Coldwell | Oct. 28, 1947 |
| 2,483,650 | Lee | Oct. 4, 1949 |
| 2,595,494 | Stratman | May 6, 1952 |
| 2,633,926 | Minor | Apr. 7, 1953 |
| 2,685,777 | Plas | Aug. 10, 1954 |
| 2,691,451 | Westfall | Oct. 12, 1954 |
| 2,693,719 | Johnson | Nov. 9, 1954 |

FOREIGN PATENTS

| | | |
|---|---|---|
| 961,585 | France | Nov. 21, 1949 |